US010254881B2

(12) United States Patent
Bandyopadhyay et al.

(10) Patent No.: US 10,254,881 B2
(45) Date of Patent: Apr. 9, 2019

(54) ULTRASONIC TOUCH SENSOR-BASED VIRTUAL BUTTON

(71) Applicant: QUALCOMM Incorporated, San Diego, CA (US)

(72) Inventors: Saurav Kumar Bandyopadhyay, Milpitas, CA (US); Eliza Yingzi Du, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 15/194,377

(22) Filed: Jun. 27, 2016

(65) Prior Publication Data
US 2016/0378244 A1 Dec. 29, 2016

Related U.S. Application Data

(60) Provisional application No. 62/186,238, filed on Jun. 29, 2015.

(51) Int. Cl.
G06F 3/041 (2006.01)
G06F 3/042 (2006.01)
G06F 3/043 (2006.01)
G06F 1/16 (2006.01)
G06F 3/0488 (2013.01)
G06F 21/32 (2013.01)

(52) U.S. Cl.
CPC .......... G06F 3/0416 (2013.01); G06F 1/1692 (2013.01); G06F 3/042 (2013.01); G06F 3/0414 (2013.01); G06F 3/0433 (2013.01); G06F 3/0488 (2013.01); G06F 21/32 (2013.01)

(58) Field of Classification Search
None
See application file for complete search history.

(56) References Cited

U.S. PATENT DOCUMENTS 7,739,912 B2   6/2010   Kitchens et al.
8,897,491 B2   11/2014  Ambrus et al.
(Continued)

FOREIGN PATENT DOCUMENTS

WO    WO-2009053956 A2    4/2009

OTHER PUBLICATIONS

International Search Report and Written Opinion—PCT/US2016/039882—ISA/EPO—dated Sep. 12, 2016.
(Continued)

Primary Examiner — Joseph R Haley
Assistant Examiner — Emily J Frank
(74) Attorney, Agent, or Firm — Weaver Austin Villeneuve & Sampson LLP

(57) ABSTRACT

An apparatus including an electronic device is configured with an ultrasonic touch sensor-based virtual button. The ultrasonic sensor is disposed behind a first portion of an exterior surface of the electronic device. A processor associated with one or both of the electronic device and the ultrasonic sensor is configured to: (i) process a signal received from the ultrasonic sensor so as to acquire image data of a surface or substance in contact with the first portion of the exterior surface; and (ii) make a first determination whether or not the acquired image data is related to an intended control touch on the first portion by determining whether or not the image data is characteristic of a fingerprint or a patterned stylus.

30 Claims, 13 Drawing Sheets

(56) References Cited

U.S. PATENT DOCUMENTS

| | | | |
|---|---|---|---|
| 9,041,690 B2 | 5/2015 | Cui et al. | |
| 2010/0099394 A1* | 4/2010 | Hainzl | G06F 1/32 |
| | | | 455/418 |
| 2010/0220900 A1* | 9/2010 | Orsley | G06F 3/0421 |
| | | | 382/124 |
| 2010/0225332 A1 | 9/2010 | Niwa et al. | |
| 2012/0071149 A1 | 3/2012 | Bandyopadhyay et al. | |
| 2014/0359757 A1* | 12/2014 | Sezan | G06F 21/32 |
| | | | 726/19 |
| 2014/0362013 A1* | 12/2014 | Nikoozadeh | G06F 3/0414 |
| | | | 345/173 |
| 2015/0023571 A1 | 1/2015 | Gozzini et al. | |
| 2015/0036065 A1 | 2/2015 | Yousefpor et al. | |
| 2015/0077351 A1 | 3/2015 | Lee | |
| 2015/0253931 A1 | 9/2015 | Wyrwas et al. | |
| 2016/0062530 A1 | 3/2016 | Huppi et al. | |
| 2016/0070968 A1 | 3/2016 | Gu et al. | |

OTHER PUBLICATIONS

Sammons B., "Breakthrough 3D Fingerprint Authentication with Snapdragon Sense ID | Qualcomm", Mar. 2, 2015 (Mar. 2, 2015), 8 Pages, XP55299103, Retrieved from the Internet: URL: https://www.qualcomn.com/news/snapdragon/2015/03/02/breakthrough-3d-fingerprintauthentication-snapdragon-sense-id [retrieved on Sep. 1, 2016] the whole document.

International Preliminary Report on Patentability—PCT/US2016/039882, International Search Authority—European Patent Office, dated Jan. 19, 2018.

\* cited by examiner

Fingerprint Image 901
Air Image 902
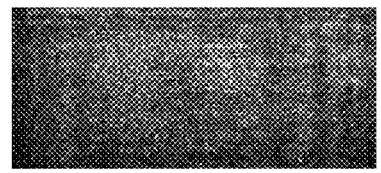
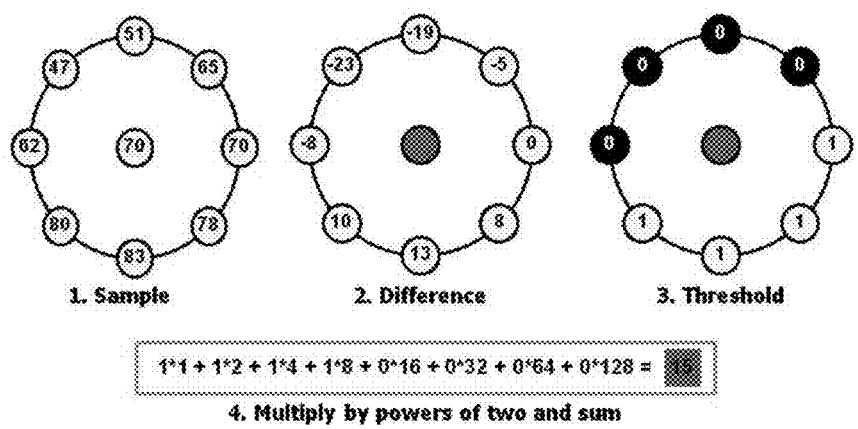
LBP Image 903
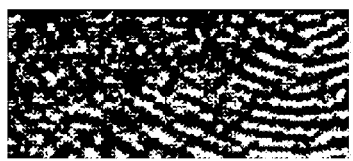
LBP Image 904
Figure 9

ULTRASONIC TOUCH SENSOR-BASED VIRTUAL BUTTON

CROSS-REFERENCE TO RELATED APPLICATIONS

This disclosure claims priority to U.S. Provisional Patent Application No. 62/186,238, filed on Jun. 29, 2015, entitled "ULTRASONIC FINGERPRINT SENSOR-BASED HOME BUTTON DESIGN," which is hereby incorporated by reference.

TECHNICAL FIELD

This disclosure relates to an ultrasonic sensor, and more particularly to techniques for low latency touch recognition using an ultrasonic sensor disposed behind a user interface surface of a mobile device.

DESCRIPTION OF THE RELATED TECHNOLOGY

Modern mobile devices, such as smart phones and tablets, incorporate a user interface that includes touch screens that can be configured to present any number of virtual buttons, i.e., "soft" keys or buttons that are displayed as visible icons, buttons or keys that enable a user to launch an application, make a call, type a message, etc. In addition, such devices commonly include a limited number of physical, pressure sensitive, mechanically actuated buttons.

In the absence of the present teachings, the virtual buttons and physical buttons have limited or no capability to enable the device to distinguish between touches/presses of a finger or stylus that are deliberately initiated by a user and accidental touches and pressures that may occur when the mobile device is in a user's pocket, purse or backpack, for example. Consequently, a well-known problem with such devices is the occurrence of so-called "pocket dialing" wherein such random touches and pressures cause accidental dialing of a third-party. Similarly, such random touches and pressures may cause unintended activation of the mobile device and result in unnecessary power consumption.

The above-mentioned problems may be exacerbated as a result of a desire to maximize touchscreen ("cover glass") area and to reduce reliance on mechanically actuated buttons.

SUMMARY

The systems, methods and devices of this disclosure each have several innovative aspects, no single one of which is solely responsible for the desirable attributes disclosed herein.

One innovative aspect of the subject matter described in this disclosure relates to an electronic device including a first exterior surface, an ultrasonic sensor disposed behind a first portion of the first exterior surface; and a processor, the processor being associated with one or both of the electronic device and the ultrasonic sensor. The processor is configured to process a signal received from the ultrasonic sensor so as to acquire image data of an object or substance in contact with the first portion of the first exterior surface and make a first determination whether or not the acquired image data is related to an intended control touch on the first portion by determining whether or not the image data is characteristic of a fingerprint or a patterned stylus.

In some examples, the ultrasonic sensor may output the signal to the processor whether or not the electronic device is in a low power mode. In some examples, when the electronic devices is in the low power mode, the processor may be configured to switch the electronic device from the low power mode to a normal power mode when the first determination is that the signal received from the ultrasonic sensor is related to an intended control touch on the first portion.

In some examples, the electronic device may include one or more of an ambient light sensor, a pressure sensor, an ambient temperature sensor and a motion detector coupled with one or both of the ultrasonic sensor and the processor. The ultrasonic sensor may transmit the signal to the processor whether or not the electronic device is in a low power mode only after one or more of (i) the ambient light sensor registering a change in ambient light level; (ii) the pressure sensor, registering a change in pressure; (iii) the ambient temperature sensor registering a change in ambient temperature; and (iv) the motion detector registering a motion of the electronic device.

In some examples, the first exterior surface may include an interactive display having a cover glass and the first portion of the at least one surface corresponds to a location of a virtual button. In some examples, the virtual button may be located on the cover glass. In some examples, the virtual button may be a home button.

In some examples, the first exterior surface may be opposite to a second exterior surface that includes an interactive display having a cover glass and the first portion of the first exterior surface corresponds to a location of a virtual button.

In some examples, the intended control touch may be a deliberate touch of a finger of a user or a stylus on the first portion of the first exterior surface.

In some examples, the processor may make the first determination within a latency period of less than 30 msec.

In some examples, the processor may be configured to adaptively distinguish between an intended control touch and one or both of an inadvertent and random contact on the first portion of the first exterior surface.

In some examples, the processor may be configured to adaptively distinguish, over a range of ambient temperatures of at least −40 C to 40 C, between an intended control touch and one or both of an inadvertent and random contact on the first portion of the first exterior surface.

In some examples, the processor may be configured to adaptively distinguish, over a range of distances between the first exterior surface and the ultrasonic sensor of at least 0 um to 600 um.

In some examples, the processor may be configured to make the first determination by executing one or more of support vector machine regression, a contemporary neural network algorithm and a deep learning technique.

In some examples, the processor may be configured to make the first determination by executing an adaptive finger detection process that includes executing, with the processor, an algorithm including a trained regression decision tree learning process. In some examples, the decision tree learning process may operate on outputs of one or more of: a ridge feature extraction process; an orientation refinement process; an orientation histogram analysis process; an orientation correlation and change and analysis process; a structural similarity of input analysis process; and a local binary pattern analysis process.

According to some implementations, a method includes receiving, at a processor of an electronic device that includes a first exterior surface, a signal from an ultrasonic sensor disposed behind a first portion of the first exterior surface, and, with the processor: processing the signal received from the ultrasonic sensor so as to acquire image data of a surface or substance in contact with the first portion of the first exterior surface; and making a first determination whether or not the acquired image data is related to an intended control touch on the first portion by determining whether or not the image data is characteristic of a fingerprint or a patterned stylus.

In some examples, the first portion of the first exterior surface may correspond to a location of a virtual button and the method may further include executing or refraining from executing a function of the virtual button based on the first determination.

According to some implementations, a non-transitory computer readable medium has software stored thereon, the software including instructions for causing a processor of an electronic device to: process a signal received from an ultrasonic sensor disposed behind a first portion of a first exterior surface of an electronic device so as to acquire image data of a surface or substance in contact with the first portion of the first exterior surface; and make a first determination whether or not the acquired image data is related to an intended control touch on the first portion by determining whether or not the image data is characteristic of a fingerprint or a patterned stylus.

According to some implementations, an apparatus includes an electronic device including a first exterior surface an ultrasonic sensor disposed behind a first portion of the first exterior surface, and means for: processing the signal received from the ultrasonic sensor so as to acquire image data of a surface or substance in contact with the first portion of the first exterior surface; and making a first determination whether or not the acquired image data is related to an intended control touch on the first portion by determining whether or not the image data is characteristic of a fingerprint or a patterned stylus.

BRIEF DESCRIPTION OF THE DRAWINGS

Details of one or more implementations of the subject matter described in this specification are set forth in this disclosure and the accompanying drawings. Other features, aspects, and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting. Like reference numbers and designations in the various drawings indicate like elements.

FIG. 9 illustrates an example of a local binary pattern analysis process, according to an implementation.

DETAILED DESCRIPTION

Details of one or more implementations of the subject matter described in this specification are set forth in this disclosure, which includes the description and claims in this document, and the accompanying drawings. Other features, aspects and advantages will become apparent from a review of the disclosure. Note that the relative dimensions of the drawings and other diagrams of this disclosure may not be drawn to scale. The sizes, thicknesses, arrangements, materials, etc., shown and described in this disclosure are made only by way of example and should not be construed as limiting.

The systems, methods and devices of the disclosure each have several innovative aspects, no single one of which is solely responsible for the desirable attributes disclosed herein. One innovative aspect of the subject matter described in this disclosure can be implemented in an electronic device having an ultrasonic sensor disposed behind an exterior surface of the electronic device. The electronic device may include a processor configured to receive and analyze signals from the ultrasonic sensor so as to distinguish an intentional touch from a finger or a stylus from an inadvertent or random pressure of an object or surface other than the finger or the stylus. In some implementations, the processor functions in the above-mentioned manner irrespective of whether or not the electronic device is powered up ("awake" or in a "normal power mode") or in a low power ("sleep") mode. In some implementations, the ultrasonic sensor may be proximate to a portion of the exterior surface corresponding to a "home button" location. As a result, important home button functions may be initiated with imperceptible latency even when the electronic device is in the sleep mode by a deliberate user touch, and pocket dialing errors may be at least largely eliminated.

Figure 1:
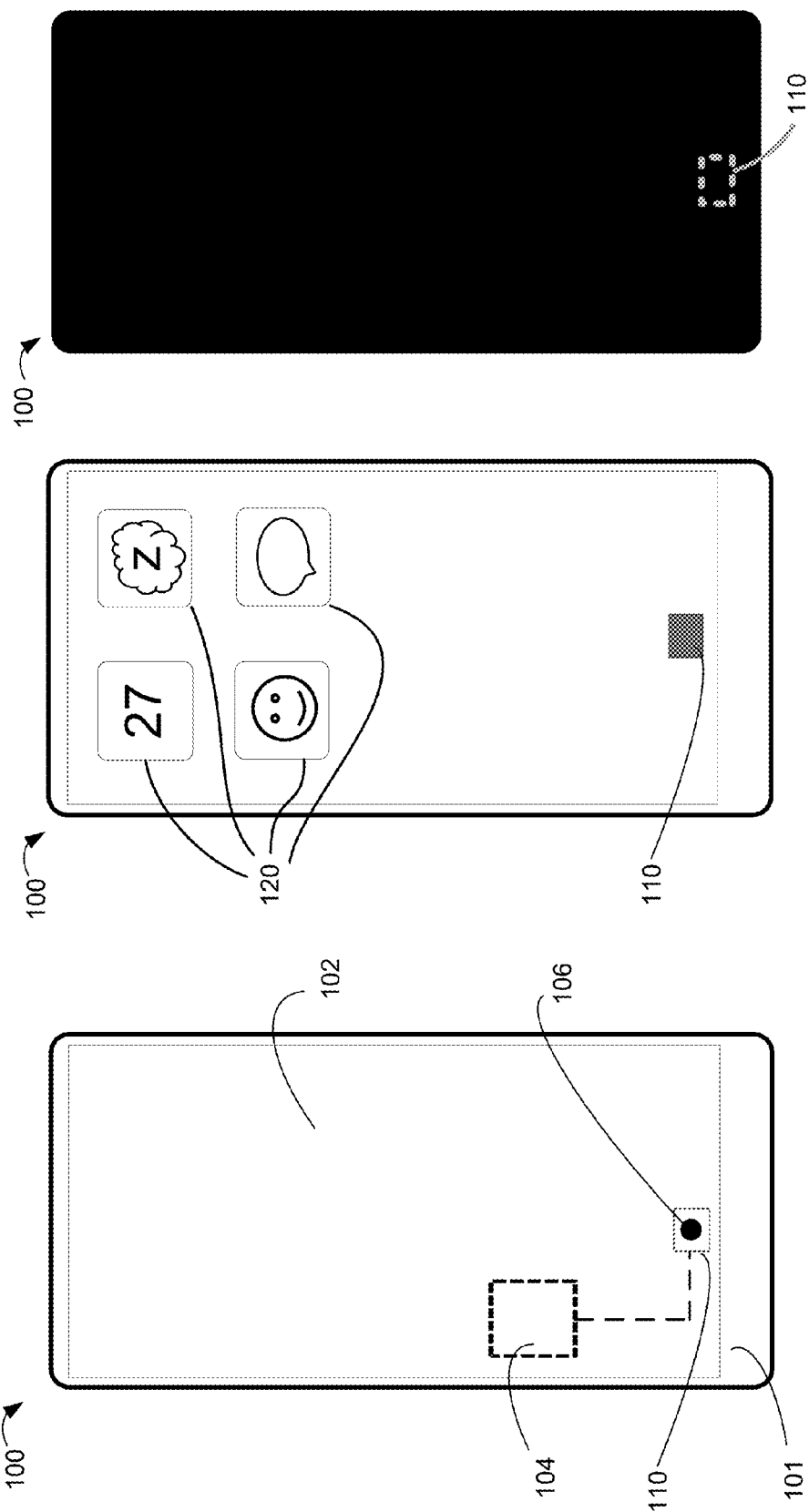
FIGS. 1A-1C illustrate an example of an electronic device according to some implementations.

FIGS. 1A-1C illustrate an example of an electronic device according to some implementations. FIG. 1A shows an example of a block diagram of an electronic device having an interactive display according to an implementation. Electronic device 100 (which may be, for example, a smart phone or other personal electronic device) includes a processor 104 and has a front exterior surface 101 that includes an interactive display 102. The interactive display 102 may be a touchscreen display configured to occupy a substantial portion of the front surface 101 of the electronic device 100. In some implementations, the interactive display 102 may have an area that is substantially coextensive with an area of the front surface 101. The interactive display 102 may be configured as an IMOD display, or other type of display, such as plasma, electroluminescent (EL), organic light emitting diode (OLED), super twisted numatic (STN) or thin film transistor (TFT) liquid crystal display (LCD), or a non-flat-panel display, such as a CRT or other tube device. The processor 104 may be configured to control an output of the interactive display 102, responsive, at least in part, to user inputs, which may include touches or gestures by a user's appendage, such as a finger, a hand or a handheld object (e.g., a stylus) or the like.

In the illustrated implementation, the processor 104 is communicatively coupled with an ultrasonic sensor 106. An example of a suitable ultrasonic sensor is described in U.S. Pat. No. 7,739,912 entitled "Ultrasonic Fingerprint Scanning Utilizing a Plane Wave", assigned to the assignee of the present invention. The ultrasonic sensor 106 may be disposed behind the front surface 101 of the electronic device 100 and proximate to a location 110, (referred to herein as a "button location") disposed within a perimeter of the front surface 101 of the electronic device 100. In the illustrated implementation, the button location 110 is disposed within a perimeter of the interactive display 102. The interactive display 102 may be configured to display any number of touch enabled icons and/or viewable image content at various locations, including a "soft" or virtual button at or within button location 110. In other implementations, the button location 110 may be outside the perimeter of the interactive display 102 (i.e., "off glass"). In such implementations, the front surface of the electronic device 100 proximate to the location 110 may not be transparent. Proximate to the location 110 the front surface material of the electronic device 100 may be glass, plastic or aluminum, for example. The ultrasonic sensor 106 may be configured to obtain image characteristics of a surface or object disposed, on or proximate to the front surface 101, near the location 110. As noted above, the ultrasonic sensor may be disposed behind the front surface 101 and may be configured to obtain image characteristics through a front surface thickness up to about 600 µm whether the front surface is glass or aluminum, for example. Such a range of surface thickness may result from placement of platens of various thickness which could be made of plastic, cover glass, aluminum or other metal, or variable thickness due to presence or absence of recess during manufacturing process and/or due to placement of additional layers e.g. screen protectors later during the device usage.

Irrespective of whether the button location 110 is inside or outside the perimeter of the interactive display 102, the button location 110 may be configured to provide a touch interface functionality for a user of the electronic device 100. In some implementations, the button location 110 may delineate a home button of the electronic device 110. The electronic device 100, according to the presently disclosed techniques, may be configured to adaptively distinguish between, for example, a deliberate touch of a user's finger or stylus on the button location 110, and a random or inadvertent pressure by an object or surface other than the user's finger or stylus.

In FIG. 1B, the electronic device 100 is illustrated as being in an operating mode (a "normal power" or "awake" mode) in which the display is illuminated and any of a plurality of virtual buttons 120 may be visible and touch actuatable. One or more of the virtual buttons 120 may be touch actuatable by means of additional ultrasonic sensors (not illustrated). Alternatively or in addition, some or all of the virtual buttons 120 may be touch actuatable by way of other techniques, such as resistive, capacitive, and projected capacitive touch (PCT) screens. In some implementations, some or all of the virtual buttons 120 may be touch actuatable using optical techniques, such as disclosed in U.S. Pat. No. 9,041,690 and U.S. Patent Publication 2015-0253931, each assigned to the assignee of the present invention and hereby incorporated in their entirety into the present disclosure.

In FIG. 1C, the electronic device 100 is illustrated as being in a low power mode (e.g., a sleep mode, or similar power-saving mode) in which the display is not illuminated and virtual buttons are not visible. In some embodiments, however, functionality of a virtual button located at, for example, the button location 110 may be provided even when the electronic device 100 is in the low power mode. For example, the ultrasonic sensor 106, which may have a current draw on the order of 10-100 microamps, may be configured to collect image data associated with the button location 110 and output corresponding signals to the processor whether or not the electronic device 100 is in the low power mode. As a result, the processor 104 may be configured to "wake" the electronic device immediately upon contact of a user's finger or stylus proximate to the button location 110. According to the presently disclosed techniques, the "waking" process occurs with almost imperceptible latency, (25-50 msec), so that the electronic device 100 is almost instantly available for use, upon being touched by the user at the button location 110.

In some implementations, the processor 104 is configured to process signals output from the ultrasonic sensor 106 in order to acquire image data of a surface or a substance in contact with the button location 110. The processor 104 may be configured to make a determination whether or not the acquired image data is related to an intended control touch on the button location 110. For example, the processor 104 may determine whether or not the image data is characteristic of a fingerprint or a patterned stylus, as opposed, for example, to air, fabric, leather or random objects. Based on the determination, the processor 104 may "wake" the electronic device 100, when the image data is determined to indicate an intended control touch.

Figure 2:
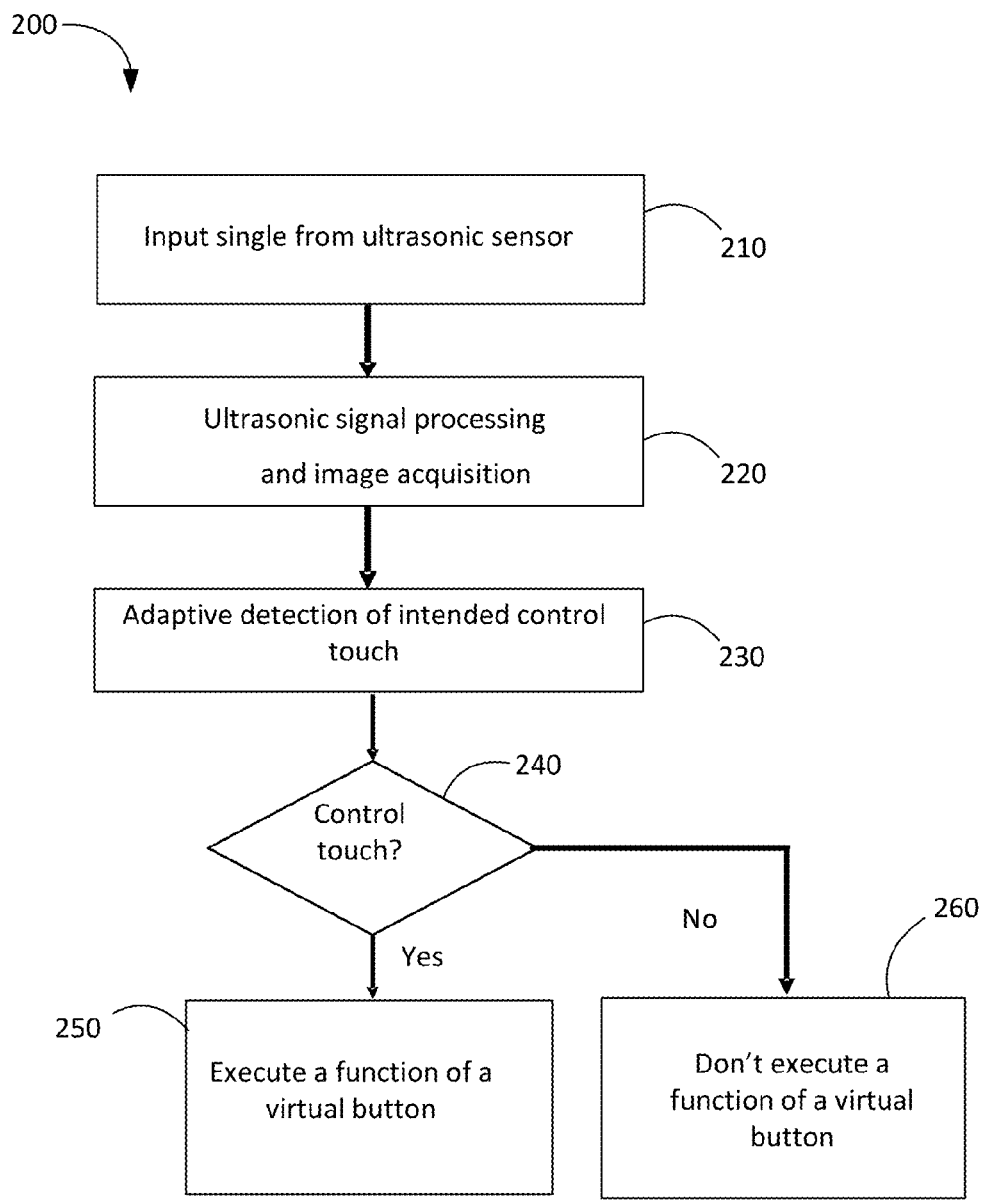
FIG. 2 illustrates an example of a flow diagram for distinguishing a finger touch from other interactions with the home button, according to an implementation.

FIG. 2 illustrates an example of a flow diagram for distinguishing a finger touch from other interactions with the home button, according to an implementation. According to the illustrated method 200, an input signal from the ultrasonic sensor may be received at block 210. For example, the processor 104 may receive signals output from the ultrasonic sensor 106. The input signal may result from a physical contact or "touch" of a finger, stylus or other object with the cover glass proximate to the button location 110. In some implementations, the processor 104 may be or include a general purpose processor of the electronic device 100 or may be a special-purpose processor associated with and/or co-located with the ultrasonic sensor 106. At block 220, the input signal may undergo processing in order to acquire an image of the surface in contact with the home button At block 230 a process for adaptive detection of an intended control touch may be executed, as described in more detail hereinbelow. The adaptive detection process may be an algorithm that is executed by the processor 104. The algorithm may operate based on an acquired image of the surface in contact with the button location 110. The acquired image may include one or more frames of image data.

At block 240 a determination may be made as to whether the acquired image is associated with an intended control touch. In some implementations, as described in detail hereinbelow, the determination may be based on whether or not the acquired image includes features characteristic of a fingerprint. Alternatively or in addition, in some implementations the acquired image may be compared to known surface characteristics of a stylus. In such implementations, the comparison may result in a decision as to whether or not the acquired image is recognized as being characteristic of the stylus.

If the determination at block 240 is that the acquired image includes features characteristic of an intended control touch, the method may proceed to block 250 and execute a function of a virtual button associated with the button location 110. In some implementations, the virtual button may be a home button of the electronic device 100, and block 250 may include switching the electronic device from a sleep mode to an awake mode in which a home screen of the electronic device 100 is displayed. Alternatively or in addition, the virtual button may relate to other functions of the electronic device 100 and the block 250 may include activating one or more of those other functions (e.g., place a telephone call, open a web browser, display a calendar or to do list, etc.). On the other hand, if the determination at block 240 is that the acquired image is not characteristic of a fingerprint or stylus, the method may proceed to block 260 with a determination to not execute any function of the virtual button.

Figure 3:
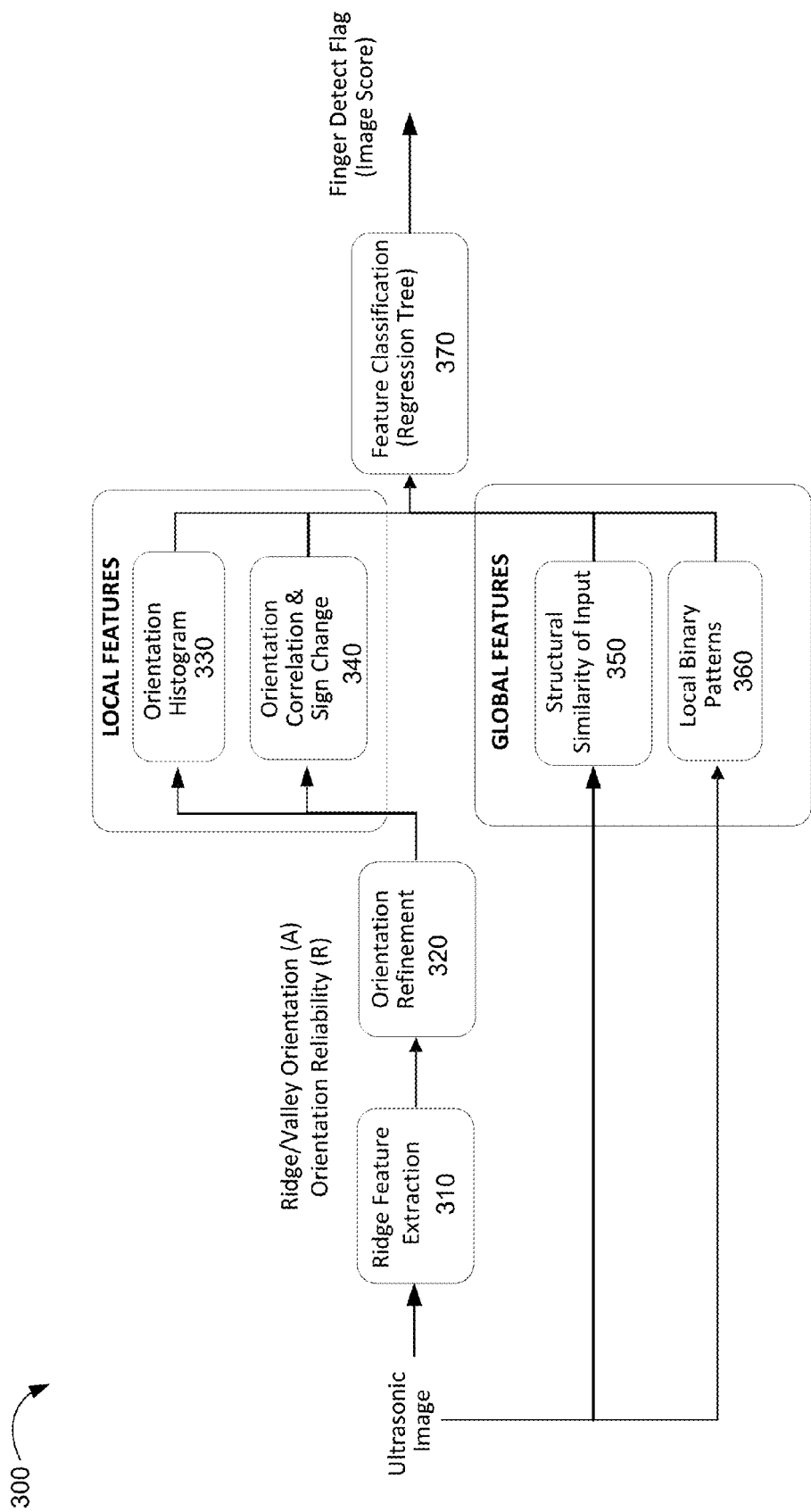
FIG. 3 illustrates an example of a process flow for a finger (stylus) detection process, according to an implementation.

FIG. 3 illustrates an example of a process flow for a finger (stylus) detection process, according to an implementation. The method 300, which may be included in block 230 of FIG. 2, illustrates a top-level sequence of processing steps, each of which is illustrated in more detail in subsequent drawings. The ultrasonic image (which may be an output of block 220 of FIG. 2) may undergo processing at block 310, a ridge feature extraction process illustrated in FIG. 4. In parallel, the ultrasonic image may also undergo processing to determine structural similarity of input, block 350, illustrated in FIG. 8, and to determine local binary patterns, block 360, illustrated in FIG. 9. Outputs from the ridge feature extraction process 310 may undergo an orientation refinement process block 320, illustrated in FIG. 5. Outputs from the orientation refinement process 320 may undergo processing in parallel by an orientation histogram process block 330, illustrated in FIG. 6, and by an orientation correlation and sign change process, block 340, illustrated in FIG. 7. Outputs of process blocks 330, 340, 350 and 360 may undergo a feature classification process, block 370, described in more detail hereinbelow.

Figure 4:
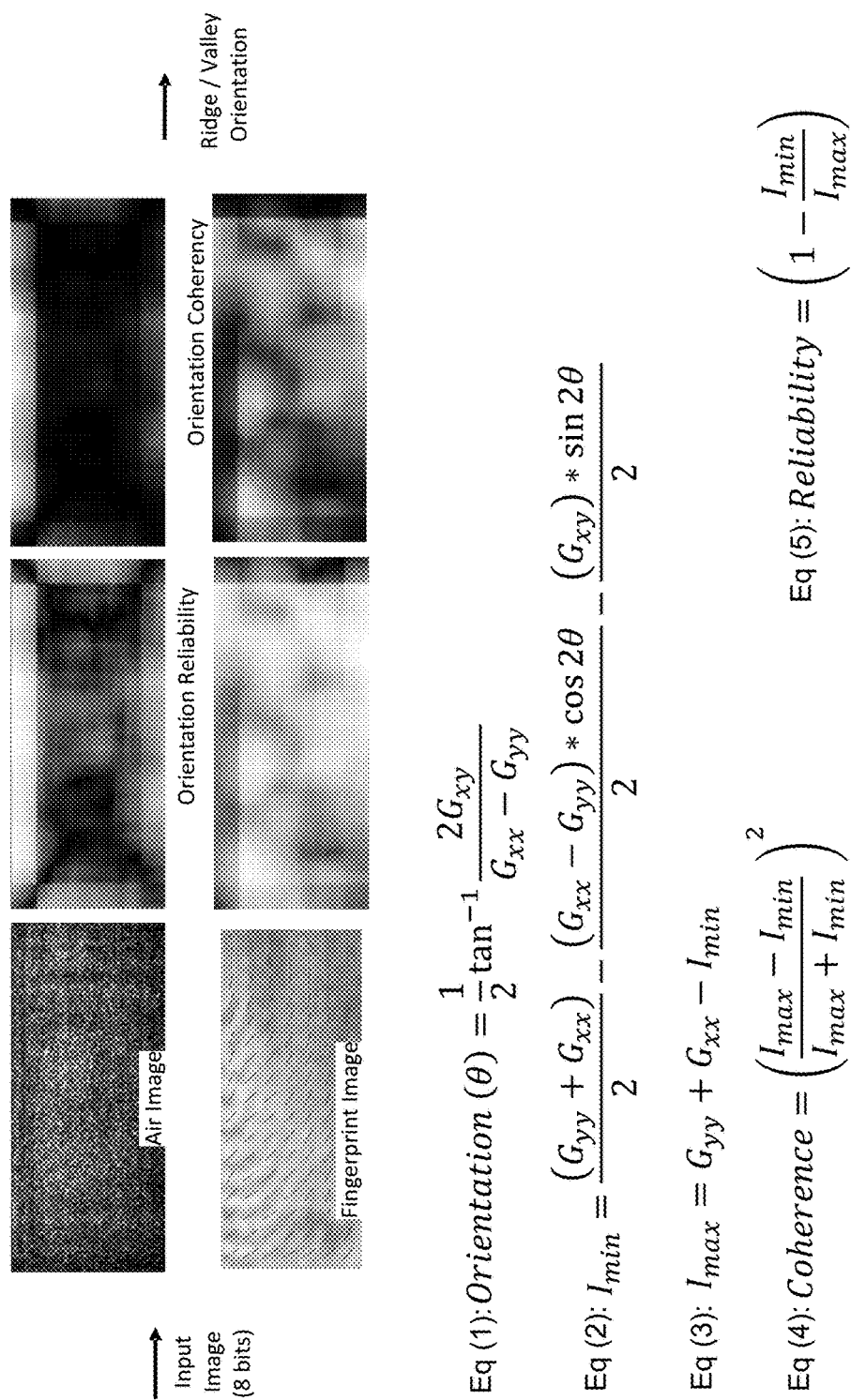
FIG. 4 illustrates an example of a ridge feature extraction process, according to an implementation.

FIG. 4 illustrates an example of a ridge feature extraction process, according to an implementation. The illustrated ridge feature extraction process may be included in block 310 of FIG. 3 for example. According to some implementations, gradient vectors (GO may be calculated by taking partial derivatives at each pixel in the acquired ultrasonic image. If the acquired ultrasonic image is of a fingerprint (or a stylus with known surface characteristics) the gradient vectors will identify the highest spatial rate of variation in gray intensity which may be correlated with fingerprint ridgeline orientation. As illustrated in FIG. 4, if the acquired ultrasonic image is of air or of a surface not characterized by fingerprint-like ridges, the gradient vectors will have an orientation pattern ("orientation map") distinguishable from the orientation pattern of gradient vectors typical of a fingerprint. "Coherence", as the term is used herein, relates to the reliability of estimation of orientation that calculates strength of an average gradient in the distribution of local orientation. "Orientation" ($\theta$), as the term is used herein is defined in terms of gradient vectors $G_{xx}$, $G_{yy}$, and $G_{xy}$ in accordance with FIG. 4, equation Eq (1). Minimum pixel intensity $I_{min}$ and maximum pixel intensity $I_{max}$ may be calculated in terms of the gradient vectors and $\theta$ as shown in FIG. 4, equations Eq (2) and Eq (3). Coherence and reliability may be calculated in terms of $I_{min}$ and $I_{max}$, as shown in FIG. 4, equations Eq (4) and Eq (5).

Figure 5:
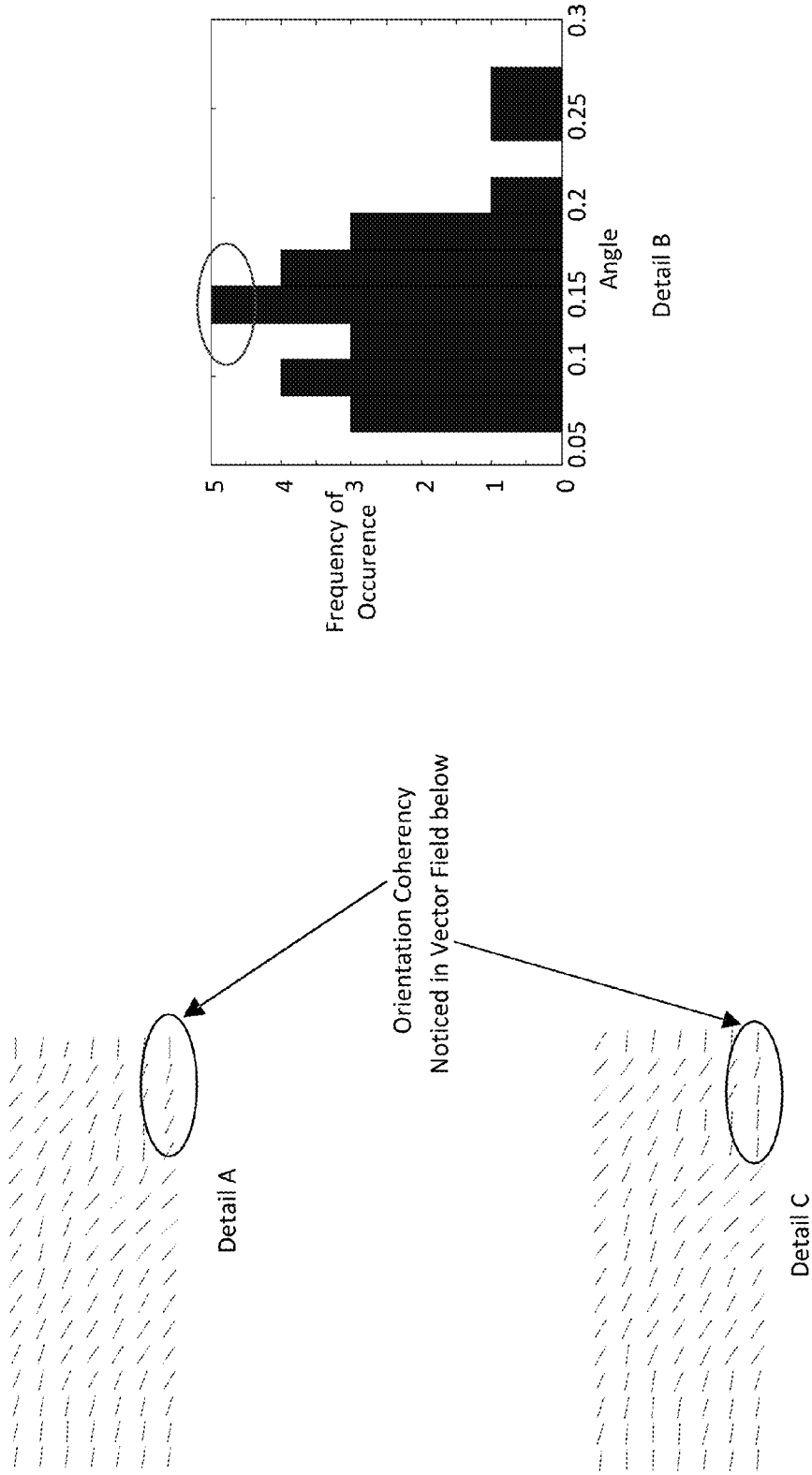
FIG. 5 illustrates an example of an orientation refinement process, according to an implementation.

FIG. 5 illustrates an example of an orientation refinement process, according to an implementation. The illustrated orientation refinement process may be included in block 320 of FIG. 3, for example. In some implementations, the orientation map (Detail A) generated by the process illustrated in FIG. 4 may be further refined by selecting a dominant orientation direction is an orientation feature. For example, the dominant orientation may be selected, as illustrated, based on evaluation of histogram data (Detail B), and using a peak of the histogram to generate a refined orientation map (Detail C). Although, in the illustrated example the orientation refinement process is executed in the spatial domain, the orientation refinement process is executed in the frequency domain.

Figure 6:
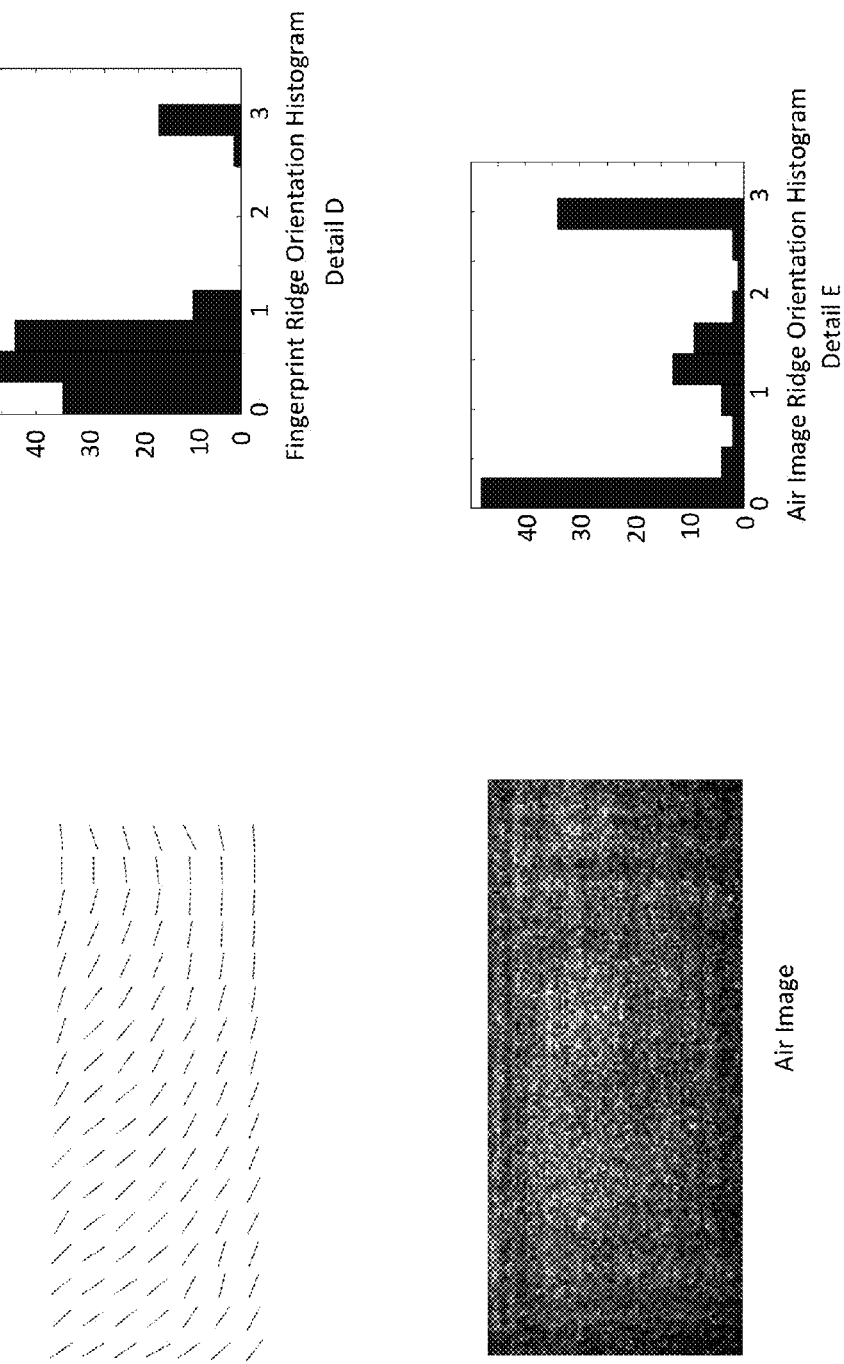
FIG. 6 illustrates an example of an orientation histogram process, according to an implementation.

FIG. 6 illustrates an example of an orientation histogram process, according to an implementation. The illustrated orientation histogram process may be included in block 330 of FIG. 3 for example. Having selected the dominant orientation direction as illustrated in FIG. 5, the orientation may be allocated to a bin of the histogram (Detail D). If the acquired ultrasonic image is of air or of a surface not characterized by fingerprint-like ridges, a corresponding histogram (Detail E) will be noisy relative to the histogram of Detail D.

Figure 7:
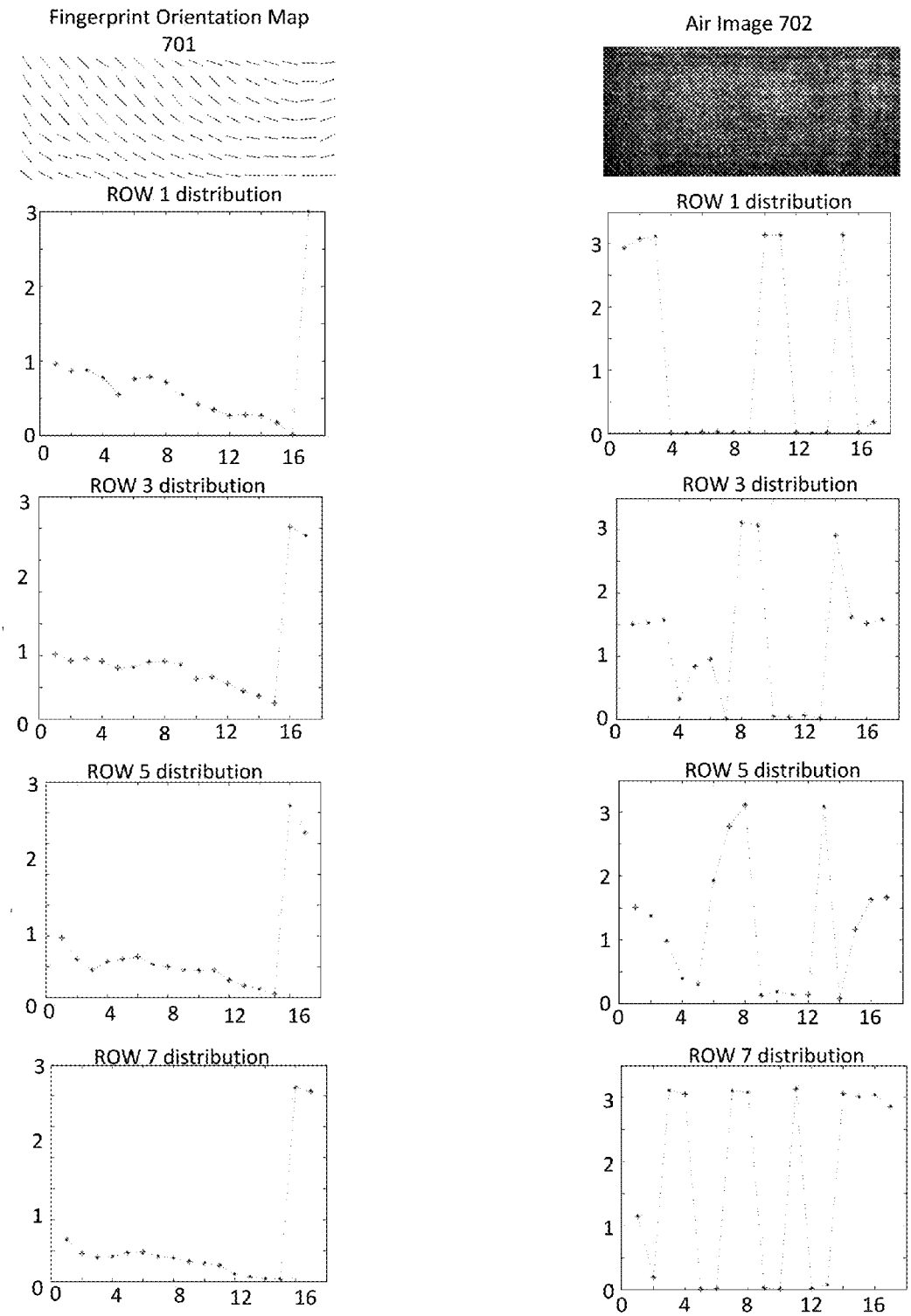
FIG. 7 illustrates an example of an orientation correlation and sign change analysis process, according to an implementation.

FIG. 7 illustrates an example of an orientation correlation and sign change analysis process, according to an implementation. The illustrated orientation correlation and sign change analysis process may be included in block 340 of FIG. 3 for example. In the illustrated example, a fingerprint orientation map 701 is configured as an array of vectors, the array having seven rows and 17 columns. Analysis of the relative correlation of the orientation of adjacent vectors in each row may be performed, as illustrated for rows 1, 3, 5 and 7. It may be observed that the orientation of adjacent vectors for the fingerprint orientation map 701 have a strong correlation (most vectors have a similar slope to neighboring vectors). It may also be observed that a single change in slope sign occurs in each row at about the $16^{th}$ or $17^{th}$ column. In distinct contrast, an orientation map of air image 702, when subjected to the same analysis, shows much less correlation between adjacent vectors, and much more frequent changes in slope sign.

Referring again to FIG. 3, it may be observed that orientation histogram process 330 and orientation correlation sign change analysis process 340 may be performed in parallel on outputs of orientation refinement process 320. Moreover, these processes, in the illustrated implementation, are performed on one or more local features of (i.e., a portion of) the ultrasonic image.

Figure 8:
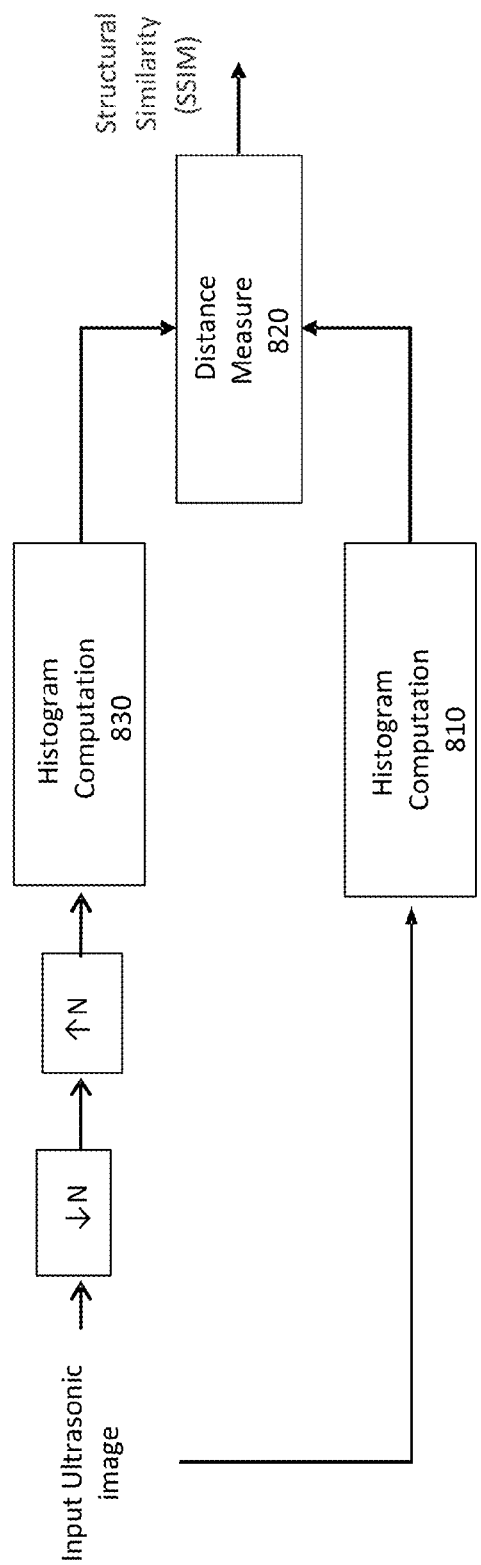
FIG. 8 illustrates an example of a structural similarity determination process, according to an implementation.

FIG. 8 illustrates an example of a structural similarity determination process, according to an implementation. The illustrated structural similarity determination process may be included in block 350 of FIG. 3 for example. In the illustrated example, a histogram is computed, at block 810, for an input ultrasonic image and compared at block 820, with a histogram output by block 830. The histogram output by block 830 is computed based on the input image after up sampling and down sampling, the up sampling and down sampling reducing image details. When the comparison performed at block 820 show a relatively high similarity between the histogram computed by block 810 in the histogram computed by block 830, it may be inferred that the input image has relatively less structural correlation. For example, the image is more likely to be of air or of a surface having a more random surface texture. On the other hand, when the comparison performed at block 820 show a relatively small similarity between the histogram computed by block 810 in the histogram computed by block 830, it may be inferred that the input image has relatively more structural correlation. For example, the image is more likely to be of a fingerprint or other surface having a well-structured texture.

FIG. 9 illustrates an example of a local binary pattern analysis process. The illustrated local binary pattern analysis process may be included in block 360 of FIG. 3 for example. In the illustrated implementation, an input ultrasonic image may be processed in order to form associated local binary pattern (LBP) images. More particularly a fingerprint image 901 is processed so as to form LBP image 903. Similarly, air image 902 is processed so as to form LBP image 904. The LBP images 903 and 904 may be more clearly distinguishable than the original images 901 and 902 as being associated with, respectively, a fingerprint image and an air image.

Referring again to FIG. 3, it may be observed that structural similarity determination process 350 and the local binary pattern analysis process 360 may be performed in parallel on the ultrasonic image. Moreover, these processes are performed, in the illustrated implementation, on global features of (i.e., substantially all of) the ultrasonic image.

Referring still to FIG. 3, outputs of blocks 330, 340, 350 and 360 may be subjected to a decision tree learning process at block 370. In some implementations, for example, a regression tree analysis may be performed of these outputs. An output of the regression tree analysis block 370 may be a numeric score indicative of a probability that a received images of a fingerprint or other structurally textured surface, as opposed to air or a randomly textured surface. For example, the numeric score may be a number between zero and one wherein one indicates a high confidence identification that an image is of a fingerprint or other structurally textured surface, and zero indicates a high confidence that the image is air or a randomly textured surface. Such regression trees are capable of generating input quality scores or probability measure of occurrence of the input object.

In some implementations, the process flow illustrated in FIG. 3 may be executed for a large number of samples as part of a "training" procedure wherein an algorithm is trained under various environmental and hardware configurations. It will be appreciated that quality and frame to frame variation of an ultrasonic image may be affected by hardware characteristics of an ultrasonic sensor, variations in temperature, humidity, noise, sensor range gate delay, and frequency setting, as well as cover glass characteristics. The training procedure, which may be executed once or periodically, may improve accuracy of the algorithm's determination of whether or not an acquired images characteristic of a fingerprint or stylus notwithstanding the presence of various amounts of dust, dirt, and moisture and temperature extremes in a range inclusive of at least −40° C. to 40° C. Results of the training may be stored as a hash table or regression tree for example.

The present inventors have found that an adaptive detection of an intended control touch algorithm configured in accordance with the present disclosure may make a highly accurate (e.g., approximately 95-98% accuracy) determination of whether or not an acquired images characteristic of a fingerprint or stylus with very low latency (approximately 10-15 msec, in some implementations). As a result, functions of a virtual button may be actuated with low latency upon a touch of a user's finger or pattern stylus and not actuated by touches of, other objects or materials such as, for example, leather, cloth, or air.

In some implementations, the presently disclosed techniques may be combined with fingerprint authentication techniques and/or liveness detection techniques such as disclosed in U.S. patent publication number 2016/007098, assigned to the assignee of the present invention, and hereby incorporated into the present disclosure in its entirety.

Figure 10:
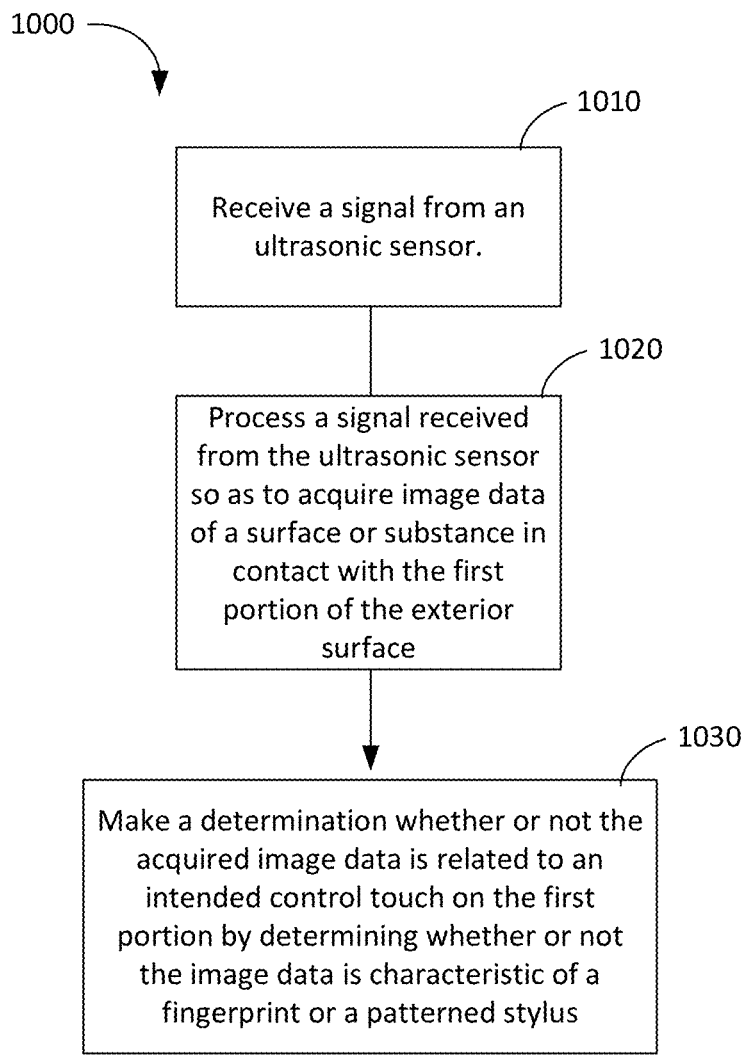
FIG. 10 illustrates an example of a method for determining whether or not acquired image data is related to an intended control touch, according to an implementation.

FIG. 10 illustrates an example of a method for determining whether or not acquired image data is related to an intended control touch, according to an implementation. As described hereinabove, the image data may be acquired by a processor from signals output by an ultrasonic sensor disposed behind a first portion of a front surface of an electronic device. In the illustrated implementation, method 1000 includes a block 1010 for receiving, with the processor a signal from the ultrasonic transducer.

The method proceeds, at block 1020, with processing the signal received from the ultrasonic sensor so as to acquire image data of a surface or substance in contact with the first portion of the front surface.

The method concludes, at block 1030, by making a determination whether or not the acquired image data is related to an intended control touch on the first portion by determining whether or not the image data is characteristic of a fingerprint or a patterned stylus.

Figure 11:
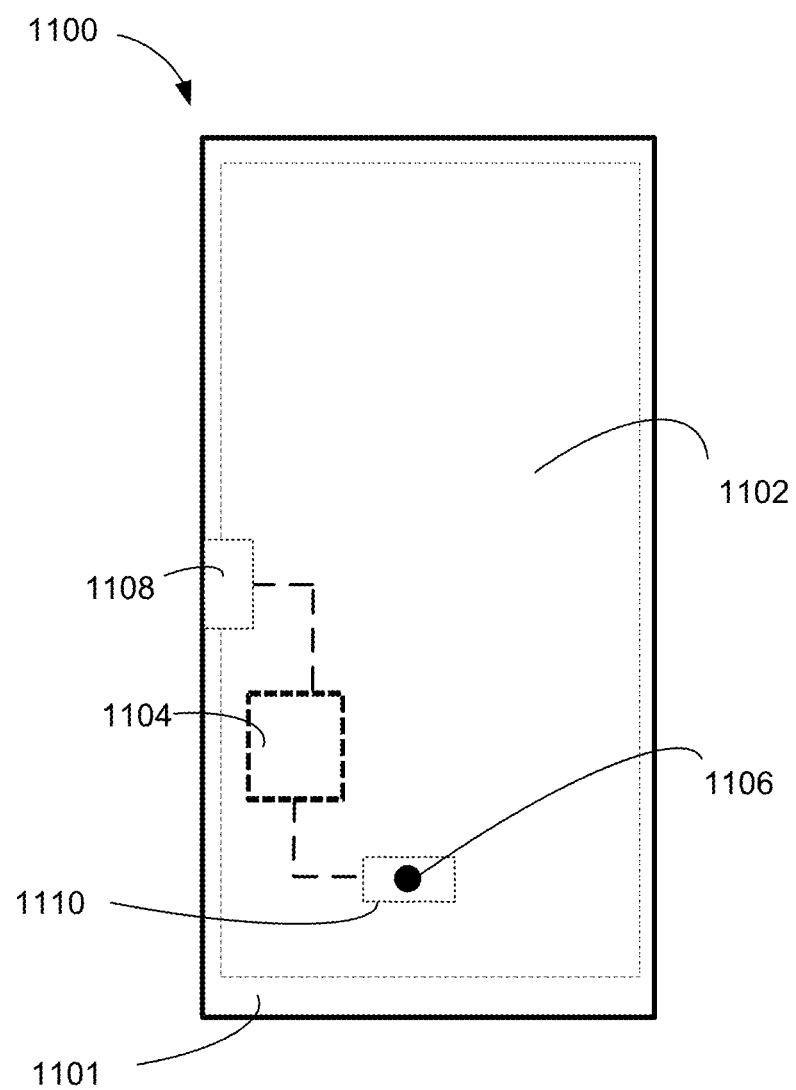
FIG. 11 shows an example of a block diagram of an electronic device having an interactive display according to a further implementation.

FIG. 11 shows an example of a block diagram of an electronic device having an interactive display according to a further implementation. Electronic device 1100 (which may be, for example, a smart phone or other personal electronic device) includes a processor 1104 and has a front surface 1101 that includes an interactive display 1102. The processor 104 may be configured to control an output of the interactive display 1102, responsive, at least in part, to user inputs, which may include touches or gestures by a user's appendage, such as a finger, a hand or a handheld object (e.g., a stylus) or the like.

In the illustrated implementation, the processor 1104 is communicatively coupled with an ultrasonic sensor 1106 and to an environmental sensor 1108. The environmental sensor 1108 may be a low-power device configured to sense, for example a change in pressure, a change in ambient light or temperature or to sense motion of the electronic device 1100. In such an implementation, the ultrasonic sensor may be configured to transmit signals to the processor, whether or not the electronic device is a low-power mode, only after the environmental sensor 1108 registers a change in pressure, ambient light or temperature, or detects a motion of the electronic device.

Figure 12:
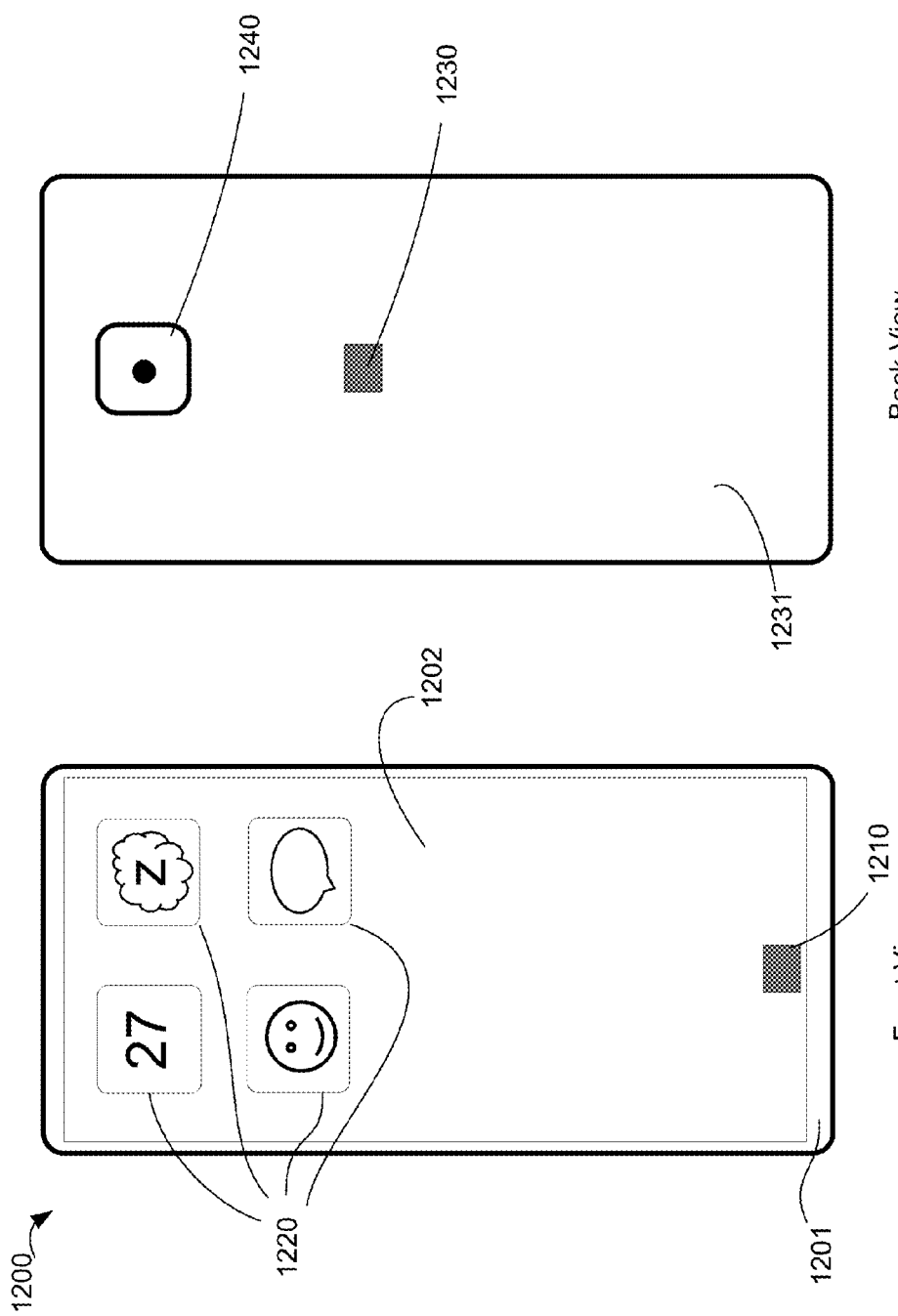
FIG. 12 shows an example of an electronic device having an interactive display according to a further implementation.

FIG. 12 shows an example of an electronic device having an interactive display according to a further implementation. Electronic device 1200 (which may be, for example, a smart phone or other personal electronic device) has a front surface 1201 that includes an interactive display 1202. An output of the interactive display 1102 may be, responsive, at least in part, to user inputs, which may include touches or gestures by a user's appendage, such as a finger, a hand or a handheld object (e.g., a stylus) or the like.

As described hereinabove, an ultrasonic sensor may be disposed behind the front surface 1201 of the electronic device 1200 and proximate to a location 1210 disposed within a perimeter of the front surface 1201 of the electronic device 100. Alternatively, or in addition, an ultrasonic sensor may be disposed behind a back surface 1231 of the electronic device 1200 and proximate to a location 1230. In some implementations, back surface 1231 may be an opaque glass, plastic or metal surface. Functionality of a virtual button located at location 1230 may be provided even when the electronic device 1200 is in a low power mode. For example, the ultrasonic sensor may be configured to collect image data associated with the button location 1230 and output corresponding signals to the processor whether or not the electronic device 1200 is in the low power mode. As a result, a processor may be configured to "wake" the electronic device immediately upon an initial contact of a user's finger or stylus proximate to the button location 1230. In some implementations, the processor may be configured to actuate a camera 1240 upon a second contact of a user's finger or stylus proximate to the button location 1230.

Figure 13C:
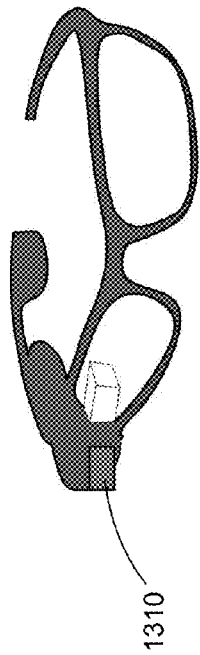
FIGS. 13A-13D include further example implementations of a virtual button.
Figure 13D:
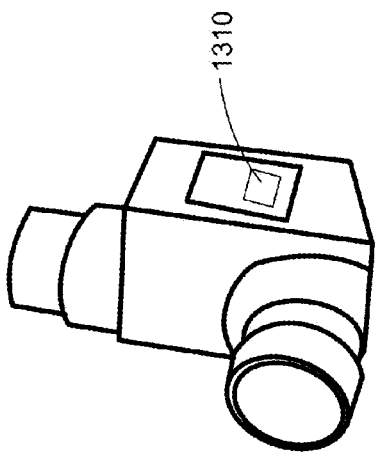
Figure 13B:
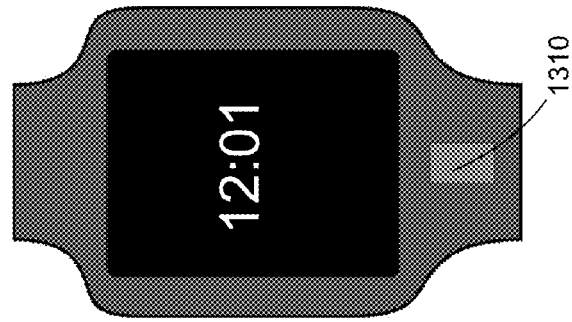
Figure 13A:
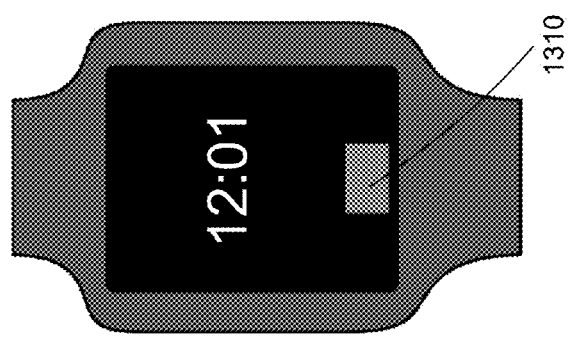

Because the ultrasonic sensor contemplated by the presently disclosed techniques is operable to collect image data whether or not the exterior surface is transparent and for a substantial variety of exterior surface thicknesses and materials, a virtual button functionality of the type disclosed hereinabove may be provided for a variety of devices, whether or not the device includes a cover glass. FIGS. 13A-13D include further example implementations of a virtual button. In each of the illustrated implementations, one or more virtual buttons 1310 are disposed on an electronic device. Each virtual button is associated with a respective ultrasonic sensor (not illustrated) disposed proximate to the virtual button. In the example implementation illustrated in FIG. 13A, a virtual button 1310 is shown disposed on a cover glass of a smart watch. Alternatively, or in addition, the virtual button 1310 may be disposed off of the cover glass, for example proximate to an opaque wristband as illustrated in FIG. 13B. A virtual button functionality may also be provided on other wearable devices, for example virtual button 1310 may be disposed on smart glasses as illustrated for example in FIG. 13C. Moreover, the disclosed techniques may be adapted to provide a virtual button functionality for other devices, including for example a smart inhaler, as illustrated in FIG. 13D.

In a yet further implementation, a virtual button as disclosed hereinabove may be located on an Internet of Things (TOT) device e.g. a computer mouse (save power by going to low power mode when one is not operating), fitness band, kiosk and/or thermostat, home equipment, such as TV or other entertainment electronics. In an implementation, one or more virtual buttons maybe disposed on a steering wheel or one or more other surfaces inside a vehicle whereby if a user touches the virtual button, inputs from the virtual button may cause a processor to give preference to manual driving over an autonomous or semi-autonomous mode of a car or vice versa.

Thus, improved techniques for distinguishing, with extremely low latency, a touch from a finger or a stylus on a cover glass of a mobile device, from an inadvertent pressure on the cover glass of an object or surface other than the finger or the stylus. It will be appreciated that a number of alternative configurations and fabrication techniques may be contemplated.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor or any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by or to control the operation of data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that can be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, as a person having ordinary skill in the art will readily appreciate, the terms "upper" and "lower", "top" and bottom", "front" and "back", and "over", "on", "under" and "underlying" are sometimes used for ease of describing the figures and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
an electronic device including a first exterior surface;
an ultrasonic sensor disposed behind a first portion of the first exterior surface; and
a processor, the processor being associated with one or both of the electronic device and the ultrasonic sensor, wherein the processor is configured to:
process a signal received from the ultrasonic sensor so as to acquire image data of a surface of an object or substance in contact with the first portion of the first exterior surface and so as to determine whether or not the acquired image data of the surface is characteristic of a structurally textured surface; and
make a first determination, only upon determining that the acquired image data of the surface is characteristic of a structurally textured surface, that the image data results from a deliberate contact of the surface with the first portion of the first exterior surface.

2. The apparatus of claim 1, wherein:
the ultrasonic sensor outputs the signal to the processor whether or not the electronic device is in a low power mode.

3. The apparatus of claim 2, wherein:
when the electronic devices is in the low power mode, the processor is configured to switch the electronic device from the low power mode to a normal power mode when the first determination is that the image data results from the deliberate contact.

4. The apparatus of claim 1, wherein:
the electronic device includes one or more of an ambient light sensor, a pressure sensor, an ambient temperature sensor and a motion detector coupled with one or both of the ultrasonic sensor and the processor;
the ultrasonic sensor transmits the signal to the processor whether or not the electronic device is in a low power mode only after one or more of (i) the ambient light sensor registering a change in ambient light level; (ii) the pressure sensor, registering a change in pressure; (iii) the ambient temperature sensor registering a change in ambient temperature; and (iv) the motion detector registering a motion of the electronic device.

5. The apparatus of claim 1, wherein the first exterior surface includes an interactive display having a cover glass and the first portion of the at least one surface corresponds to a location of a virtual button.

6. The apparatus of claim 5, wherein the virtual button is located on the cover glass.

7. The apparatus of claim 5, wherein the virtual button is a home button.

8. The apparatus of claim 1, wherein the first exterior surface is opposite to a second exterior surface that includes an interactive display having a cover glass and the first portion of the first exterior surface corresponds to a location of a virtual button.

9. The apparatus of claim 1, wherein the deliberate contact of the surface is by a finger or stylus of a user on the first portion of the first exterior surface.

10. The apparatus of claim 1, wherein the processor makes the first determination within a latency period of less than 30 msec.

11. The apparatus of claim 1, wherein the processor is configured to adaptively distinguish between the deliberate contact and one or both of an inadvertent and random contact on the first portion of the first exterior surface.

12. The apparatus of claim 1, wherein the processor is configured to adaptively distinguish, over a range of ambient temperatures of at least −40 C to 40 C, between the deliberate contace and one or both of an inadvertent and random contact on the first portion of the first exterior surface.

13. The apparatus of claim 1, wherein the processor is configured to adaptively distinguish, over a range of distances between the first exterior surface and the ultrasonic sensor of at least 0 um to 600 um.

14. The apparatus of claim 1, wherein the processor is configured to make the first determination by executing one or more of support vector machine regression, a contemporary neural network algorithm and a deep learning technique.

15. The apparatus of claim 1, wherein the processor is configured to make the first determination by executing an adaptive finger detection process that includes executing, with the processor, an algorithm including a trained regression decision tree learning process.

16. The apparatus of claim 15, wherein the decision tree learning process operates on outputs of one or more of:

a ridge feature extraction process;
an orientation refinement process;
an orientation histogram analysis process;
an orientation correlation and change and analysis process;
a structural similarity of input analysis process; and
a local binary pattern analysis process.

17. A method comprising:
receiving, at a processor of an electronic device that includes a first exterior surface, a signal from an ultrasonic sensor disposed behind a first portion of the first exterior surface, and, with the processor:
processing the signal received from the ultrasonic sensor so as to acquire image data of a surface of an object or substance in contact with the first portion of the first exterior surface and so as to determine whether or not the acquired image data of the surface is characteristic of a structurally textured surface; and
making a first determination, only upon determining that the acquired image data of the surface is characteristic of a structurally textured surface, that the image data results from a deliberate contact of the surface with the first portion of the first exterior surface.

18. The method of claim 17, wherein:
the ultrasonic sensor outputs the signal to the processor whether or not the electronic device is in a low power mode.

19. The method of claim 18, further comprising:
when the electronic devices is in the low power mode, switching the electronic device from the low power mode to a normal power mode when the first determination is that the image data results from the deliberate contact.

20. The method of claim 17, wherein the first portion of the first exterior surface corresponds to a location of a virtual button and further comprising executing or refraining from executing a function of the virtual button based on the first determination.

21. The method of claim 17, wherein making the first determination includes adaptively distinguishing between an intended control touch and one or both of an inadvertent and random contact on the first portion of the first exterior surface.

22. The method of claim 17, wherein making the first determination includes executing one or more of support vector machine regression, a contemporary neural network algorithm and a deep learning technique.

23. The method of claim 17, wherein making the first determination includes executing an adaptive finger detection process that includes executing an algorithm including a trained regression decision tree learning process.

24. The method of claim 23, wherein the decision tree learning process operates on outputs of one or more of:
a ridge feature extraction process;
an orientation refinement process;
an orientation histogram analysis process;
an orientation correlation and change and analysis process;
a structural similarity of input analysis process; and
a local binary pattern analysis process.

25. A non-transitory computer readable medium having software stored thereon, the software including instructions for causing a processor of an electronic device to:
process a signal received from an ultrasonic sensor disposed behind a first portion of a first exterior surface of an electronic device so as to acquire image data of a surface of an object or substance in contact with the first portion of the first exterior surface and so as to determine whether or not the acquired image data of the surface is characteristic of a structurally textured surface; and
make a first determination, only upon determining that the acquired image data of the surface is characteristic of a structurally textured surface, that the image data results from a deliberate contact of the surface with the first portion of the first exterior surface.

26. The computer readable medium of claim 25, wherein:
the ultrasonic sensor outputs the signal to the processor whether or not the electronic device is in a low power mode.

27. The computer readable medium of claim 26, software further including instructions for causing a processor of an electronic device to:
switch, when the electronic devices is in the low power mode, the electronic device from the low power mode to a normal power mode when the first determination is that the signal image data results from the deliberate contact.

28. An apparatus comprising:
an electronic device including a first exterior surface;
an ultrasonic sensor disposed behind a first portion of the first exterior surface; and
means for:
processing the signal received from the ultrasonic sensor so as to acquire image data of a surface of an object or substance in contact with the first portion of the first exterior surface and so as to determine whether or not the acquired image data of the surface is characteristic of a structurally textured surface; and
make a first determination, only upon determining that the acquired image data of the surface is characteristic of a structurally textured surface, that the image data results from a deliberate contact of the surface with the first portion of the first exterior surface.

29. The apparatus of claim 28, wherein the first exterior surface includes an interactive display having a cover glass and the first portion of the first exterior surface corresponds to a location of a virtual button.

30. The apparatus of claim 28, wherein the deliberate contact of the surface is by a finger or stylus of a user on the first portion of the first exterior surface.

* * * * *